March 25, 1952 — J. H. ORR — 2,590,448
MOVABLE WINDOW FOR VEHICLES
Filed Dec. 10, 1948
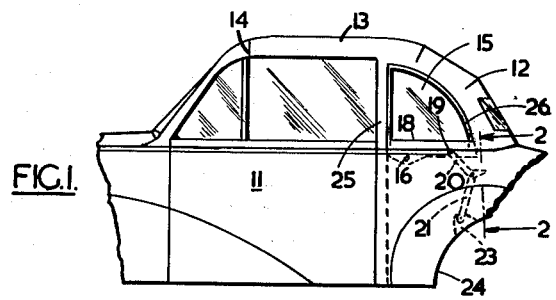
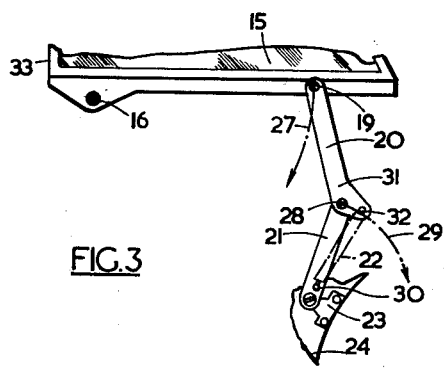
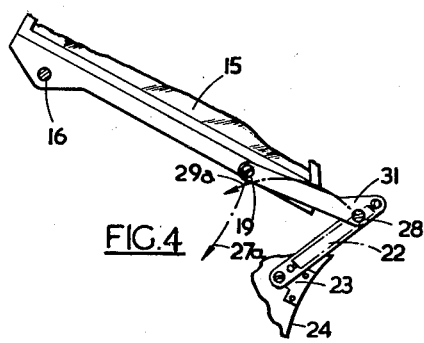
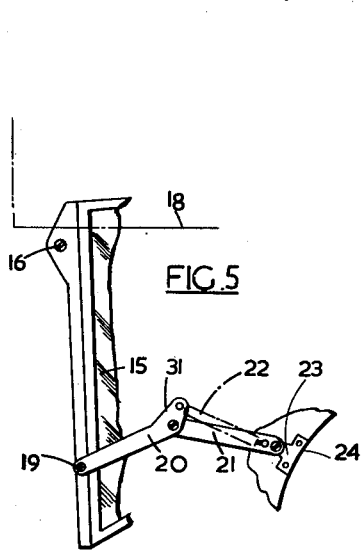
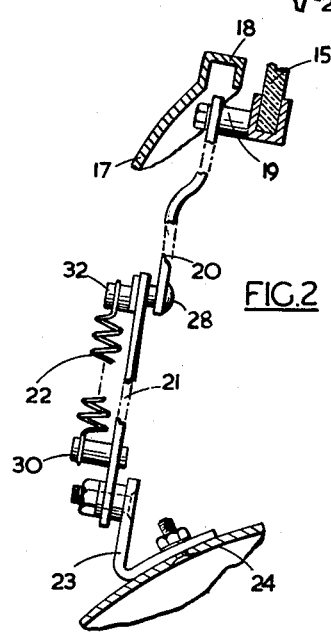
INVENTOR
JOHN H. ORR Patented Mar. 25, 1952

2,590,448

UNITED STATES PATENT OFFICE 2,590,448

MOVABLE WINDOW FOR VEHICLES

John H. Orr, Coventry, England, assignor to Carbodies Limited, Coventry, England Application December 10, 1948, Serial No. 64,593
In Great Britain September 16, 1948

2 Claims. (Cl. 296—44)

The object of this invention is to provide an improved method of arranging and supporting a movable window of a vehicle body.

According to the invention, a vehicle body has a window with a lower corner at which it is connected to the body for movement about an axis which is substantially at right-angles to the plane of the window, the body being adapted to receive the window when moved to an opened position, and means for supporting the window in different angular positions.

The supporting means may include a toggle mechanism which is resiliently biased for counter-balancing the window in the different angular positions.

In the accompanying drawings:

Figure 1 is a side elevation of part of a motor-car body, of the drop-head type, equipped with a window according to the invention;

Figure 2 is a sectional view, to an enlarged scale, on the line 2—2 of Figure 1; and Figures 3, 4 and 5 show successive positions of the window in being moved from the closed to the fully opened position.

Referring to the drawings, the motor-car body shown is one having a wide door 11 for giving access to front and rear seats, and it has a rear head portion 12 and a forward head portion 13, of which latter the forward edge can be held in contact with the wind-screen frame 14 as shown.

To provide daylight for the occupants of the rear seats the window 15 is sector-shaped and is pivoted at 16, within the car body 17, beneath the upper edge 18 of the latter. The window at 19 is connected by a toggle device, including arms 20, 21 and a spring 22, to a bracket 23 fast with the wheel arch 24 within the body.

The window, when in the closed position, is adapted to abut a hoop 25 which serves as a forward support for the head portion 12, and the latter can incorporate an inverted channel, indicated at 26, for engaging over the curved edge of the window.

Figure 3 corresponds with the closed position of the window (i. e., the position shown in Figure 1) and it will be seen that when the window is turned clockwise in the direction of the arrow 27, the toggle pivot 28 moves firstly in the direction of the arrow 29, thus progressively further stressing the spring 22 which, as shown, is anchored to the limb 21, at 30, and to a heel 31 of the member 20, at 32. This further stressing of the spring counteracts the increasing moment of the window, about its pivot 16, due to portions thereof moving from above the pivot towards the right thereof.

The movement just described is continued until the condition shown by Figure 4 is reached in which it will be observed that the line of action of the spring 22 has moved to become coincident with the line joining the pivots of the arm 21. Further downward movement of the window, in the direction of the arrow 27a, turns the member 21 in the counterclockwise direction for the toggle pivot to take the path indicated by the arrow 29a (the spring becoming over-set) until the position of Figure 5 is reached, in which latter figure it will be observed the effort of the spring 22 is reduced, its main function being firmly to hold the window in the open position.

In designing the toggle and spring arrangement the positions of the various pivots, in relation to the weight of the window and the strength of the spring, is such that the weight of the window is always counterbalanced, except possibly in the fully opened position of the window.

Obviously there may be buffers (not shown) with which the window, when in its fully opened position, can abut, and there may be any suitable handgrip device for enabling the window to be moved easily. Thus a small knob (not shown) can be made fast at the inside of the window frame member 33 which is the one which is vertical when the window is closed.

The window of the invention could obviously be supported within the door of a two-seater motor-car having a drop-head or it could be used in a suitable position in a saloon car, or in another type of vehicle such, for instance, as a caravan, or for the driver's cab of a 'bus or truck.

What I claim as my invention and desire to secure by Letters Patent of the United States is:

1. An automobile body with a window having a lower corner pivoted to the body for arcuate movement, about an axis which is transverse to the plane of the window, between a closed position and an open position, in which latter position the window lies within the body, a pair of toggle arms acting in a plane parallel to that of the window and interconnecting the body and the window remotely from the pivot of the latter, the toggle arms being only slightly out of alignment and acting from opposite sides of the lower edge of the window when the latter is in its extreme positions but folding to a greater extent in intermediate positions of the window, and a resilient means interconnecting the toggle arms and biassing them towards an aligned position for holding the widow in its said extreme positions, said resilient means, in intermediate angular positions of the window, being stressed by the relative movement of its interconnections to counter balance the movement of the window.

2. An automobile body with a window having a lower corner pivoted to the body for arcuate movement, about an axis which is transverse to the plane of the window, between a closed position and an open position, in which latter position the window lies within the body, a pair of toggle arms acting in a plane parallel to that of the window and interconnecting the body and the window remotely from the pivot of the latter, the toggle arms being only slightly out of alignment and acting from opposite sides of the lower edge of the window when the latter is in its extreme positions but folding to a greater extent in intermediate positions of the window, a portion of one toggle arm extending beyond the toggle pivot, a contractile member, an anchorage for one end of said contractile member to the extending portion of said one toggle arm, and an anchorage for the other end of said contractile member to the other toggle arm, said anchorages being on opposite sides of said toggle pivot and being spaced from each other, according to intermediate angular positions of the window, to stress the contractile member for counteracting the movement of the window about its pivot, and said contractile member biassing said toggle arms towards an aligned position for holding the window in its said extreme positions.

JOHN H. ORR.

REFERENCES CITED

The following references are of record in the file of this patent:

UNITED STATES PATENTS

| Number | Name | Date |
|---|---|---|
| 930,641 | Brethouwer | Aug. 10, 1909 |
| 2,276,512 | Parsons | Mar. 17, 1942 |
| 2,475,985 | Parsons | July 12, 1949 |

FOREIGN PATENTS

| Number | Country | Date |
|---|---|---|
| 181,138 | Switzerland | Mar. 2, 1936 |
| 453,923 | Great Britain | Sept. 21, 1936 |